US009760784B2

(12) United States Patent
Oami

(10) Patent No.: US 9,760,784 B2
(45) Date of Patent: Sep. 12, 2017

(54) DEVICE, METHOD AND PROGRAM FOR MEASURING NUMBER OF PASSENGERS

(71) Applicant: NEC Corporation, Minato-ku, Tokyo (JP)

(72) Inventor: Ryoma Oami, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/438,388

(22) PCT Filed: Oct. 10, 2013

(86) PCT No.: PCT/JP2013/006040
§ 371 (c)(1),
(2) Date: Apr. 24, 2015

(87) PCT Pub. No.: WO2014/064898
PCT Pub. Date: May 1, 2014

(65) Prior Publication Data
US 2015/0278617 A1 Oct. 1, 2015

(30) Foreign Application Priority Data
Oct. 26, 2012 (JP) .................................. 2012-236246

(51) Int. Cl.
G06K 9/00 (2006.01)
G06T 1/60 (2006.01)
(52) U.S. Cl.
CPC ..... G06K 9/00838 (2013.01); G06K 9/00228 (2013.01); G06T 1/60 (2013.01)
(58) Field of Classification Search
None
See application file for complete search history.

(56) References Cited

U.S. PATENT DOCUMENTS

2006/0165277 A1* 7/2006 Shan .................. G06K 9/00785
382/159
2008/0143835 A1* 6/2008 Abe ......................... B60R 1/00
348/148

(Continued)

FOREIGN PATENT DOCUMENTS

JP   H10-55445 A     2/1998
JP   2002-170138 A   6/2002

(Continued)

OTHER PUBLICATIONS

International Search Report for PCT Application No. PCT/JP2013/006040, mailed on Jan. 14, 2014.

(Continued)

Primary Examiner — Sean Conner

(57) ABSTRACT

Although persons on board in a driver's seat and a passenger seat can be detected, it is difficult to detect persons on board in a back seat and thus the number of passengers cannot be accurately measured. Image obtaining means 100 photographs the inside of a vehicle from the outside of the vehicle (a shoulder, etc.). View determining means 102 estimates the way in which the vehicle in the image photographed by the image obtaining means 100 is viewed, and outputs a view determination result. Person detecting means 101 performs front-face, side-face, and angled-face detection on the image photographed by the image obtaining means 100, to detect persons and outputs a person detection result. In-vehicle position estimating means 103 determines at which positions in the vehicle the detected persons are present, using the person detection information and the view determination result information, and outputs in-vehicle position estimation information. Result integrating means 104 integrates detection results obtained for a plurality of images which are (Continued)

photographed consecutively, to calculate the number of passengers.

10 Claims, 7 Drawing Sheets

(56) References Cited

U.S. PATENT DOCUMENTS

| | | | |
|---|---|---|---|
| 2008/0175438 A1* | 7/2008 | Alves | G08G 1/0175 |
| | | | 382/105 |
| 2010/0201507 A1* | 8/2010 | Rao | B60R 21/01538 |
| | | | 340/435 |
| 2012/0262577 A1* | 10/2012 | Wang | G06K 9/00369 |
| | | | 348/148 |
| 2013/0100286 A1* | 4/2013 | Lao | G06K 9/00785 |
| | | | 348/148 |
| 2013/0278768 A1* | 10/2013 | Paul | G06K 9/00369 |
| | | | 348/148 |

FOREIGN PATENT DOCUMENTS

| | | |
|---|---|---|
| JP | 2012-128862 A | 7/2012 |
| JP | 2012-158968 A | 8/2012 |

OTHER PUBLICATIONS

Philip M. Birch, Rupert C. D. Young, Frederic Claret-Tournier, Chris R. Chatwin, "Automated vehicle occupancy monitoring", Optical Engineering, vol. 43, No. 8, pp. 1828-1832, Aug. 2004.

* cited by examiner

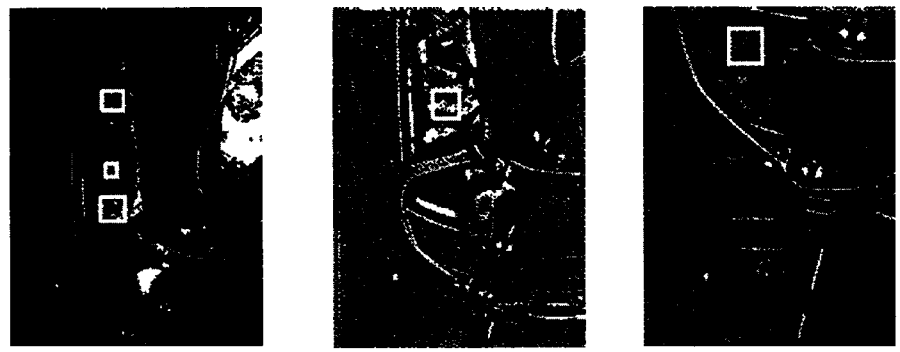
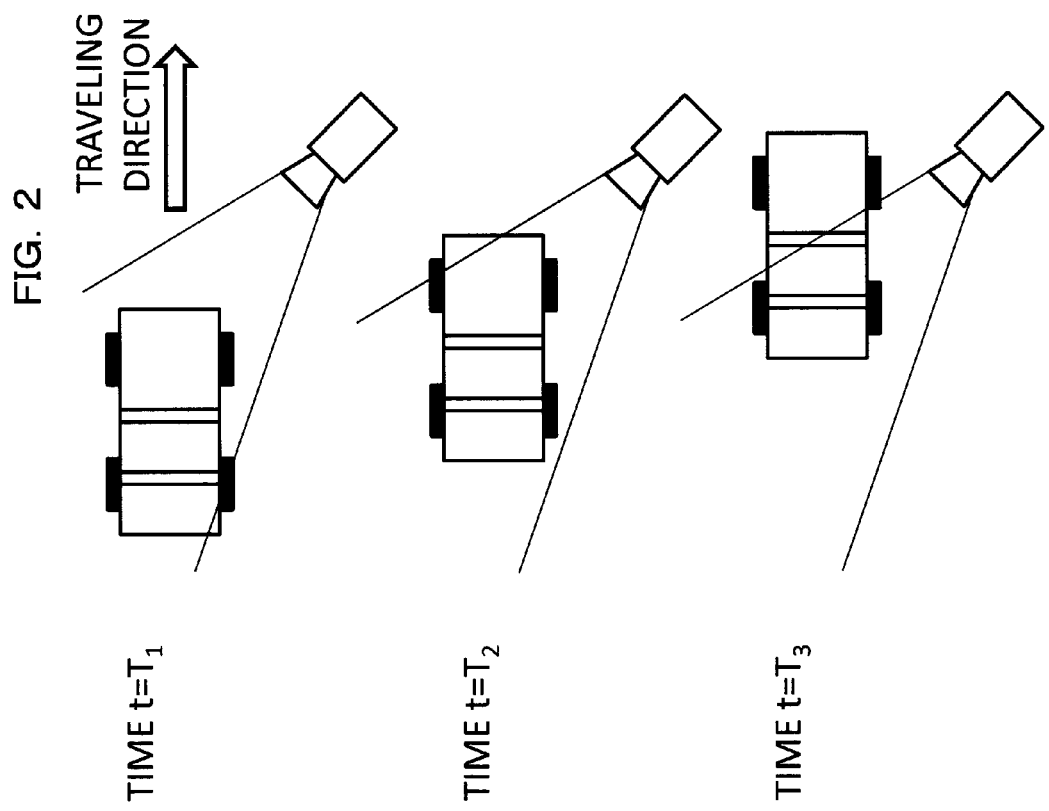
FIG. 2

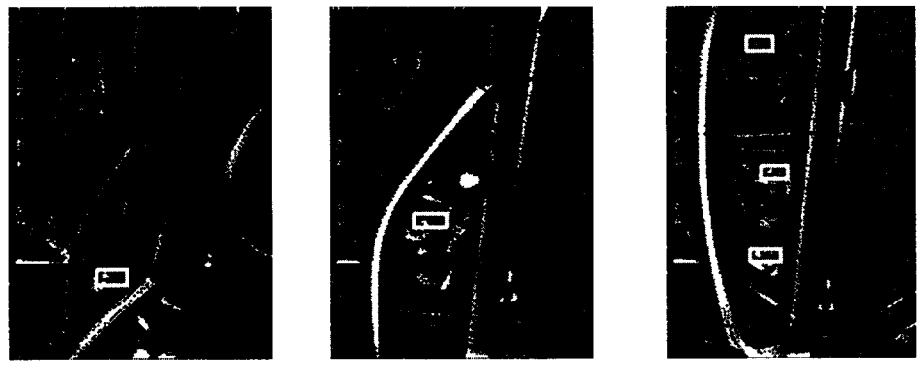
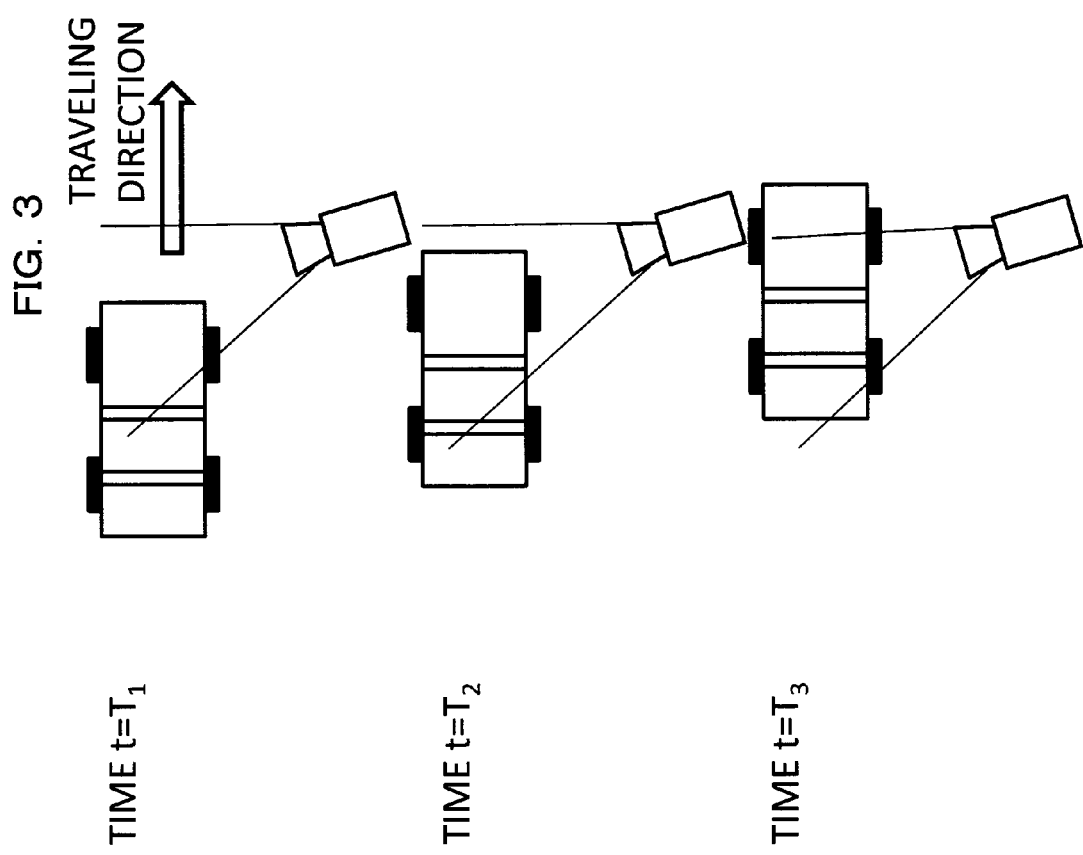
FIG. 3

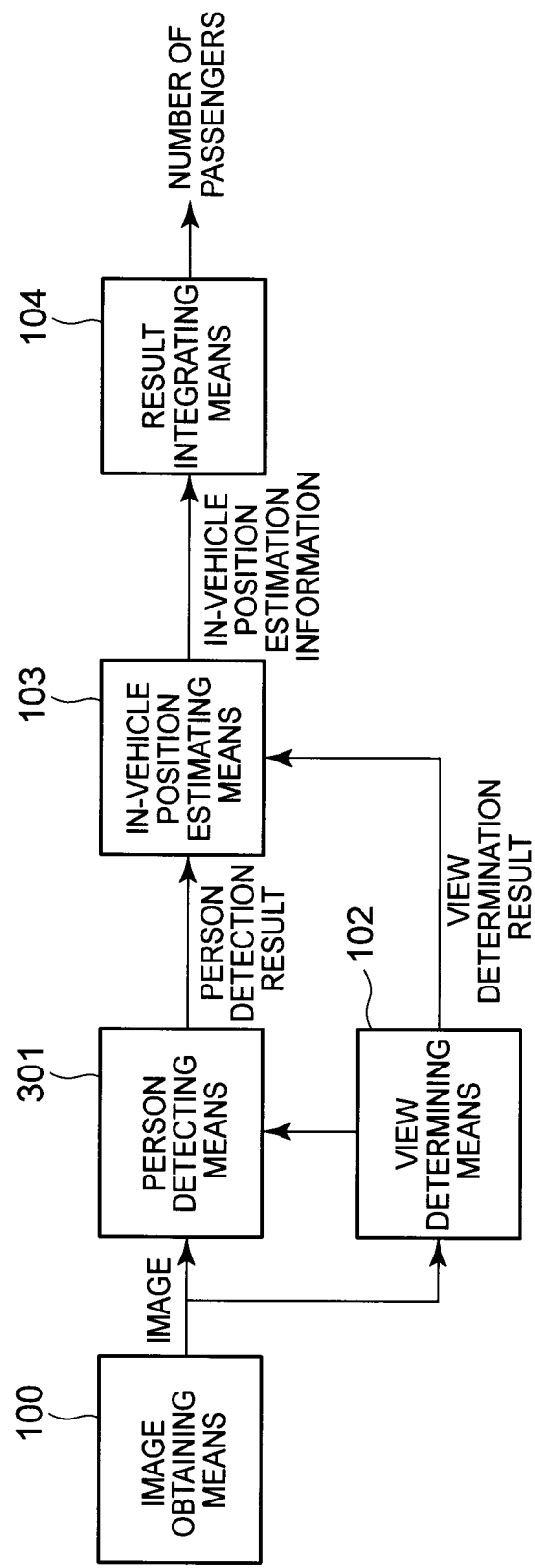

DEVICE, METHOD AND PROGRAM FOR MEASURING NUMBER OF PASSENGERS

This application is a National Stage Entry of PCT/JP2013/006040 filed on Oct. 10, 2013, which claims priority from Japanese Patent Application 2012-236246 filed on Oct. 26, 2012, the contents of all of which are incorporated herein by reference, in their entirety.

TECHNICAL FIELD

The present invention relates to a device, a method, and a program for measuring the number of passengers that count the number of persons on board a vehicle, and more particularly to a device, a method, and a program for measuring the number of passengers that measure the number of passengers from images photographed by a camera placed outside a vehicle.

BACKGROUND ART

For a scheme for counting the number of passengers by photographing the inside of a vehicle by a camera disposed outside the vehicle, for example, NPL 1 describes a scheme for detecting persons in a vehicle by detecting faces from an image of the persons photographed through the front glass.

CITATION LIST

Non Patent Literature

NPL 1: Philip M. Birch, Rupert C. D. Young, Frederic Claret-Tournier, Chris R. Chatwin, "Automated vehicle occupancy monitoring", Optical Engineering, Vol. 43, No. 8, pp. 1828-1832, 2004-8.

SUMMARY OF INVENTION

Technical Problem

However, when photographing is performed by a camera placed in front of a vehicle, although persons on board in a driver's seat and a passenger seat can be detected, it is difficult to detect persons on board in a back seat and thus the number of passengers cannot be accurately measured.

An object of the present invention is therefore to provide a device, a method, and a program for measuring the number of passengers that accurately measure the number of passengers also including persons sitting in a back seat of a vehicle.

Solution to Problem

A device for measuring a number of passengers of the present invention includes: image obtaining means for obtaining an image; person detecting means for detecting persons on board in a vehicle from the obtained image and generating a person detection result, the vehicle being a target for measuring a number of persons; view determining means for determining view indicating how the vehicle is viewed in the image, and generating a view determination result; in-vehicle position estimating means for estimating, from the person detection result and the view determination result, at which positions in the vehicle the persons are on board and generating, for each image, an in-vehicle position estimation result; and result integrating means for integrating the plurality of in-vehicle position estimation results obtained for the vehicle and determining a number of passengers from an integration result.

By this, persons are detected from video photographed by the image obtaining means, in-vehicle positions of the persons are estimated from a result of determination of view determined by the view determining means and a result of the detection of the persons, and the estimated in-vehicle positions of the persons are integrated for a plurality of images, by which the positions of the persons in the vehicle can be determined. From this result, the number of passengers can be measured.

A method for measuring a number of passengers of the present invention includes: obtaining an image; detecting persons on board a vehicle from the obtained image and generating a person detection result, the vehicle being a target for measuring a number of persons; determining view indicating how the vehicle is viewed in the image, and generating a view determination result; estimating, from the person detection result and the view determination result, at which positions in the vehicle the persons are on board and generating, for each image, an in-vehicle position estimation result; and integrating the plurality of in-vehicle position estimation results obtained for the vehicle and determining a number of passengers from an integration result.

A program for measuring a number of passengers of the present invention causes a computer to perform: a process of obtaining an image; a process of detecting persons on board in a vehicle from the obtained image and generating a person detection result, the vehicle being a target for measuring a number of persons; a process of determining view indicating how the vehicle is viewed in the image, and generating a view determination result; a process of estimating, from the person detection result and the view determination result, at which positions in the vehicle the persons are on board and generating, for each image, an in-vehicle position estimation result; and a process of integrating the plurality of in-vehicle position estimation results obtained for the vehicle and determining a number of passengers from an integration result.

Advantageous Effects of Invention

According to the present invention, since persons including those in a back seat can also be detected, the number of passengers can be accurately measured.

BRIEF DESCRIPTION OF DRAWINGS

FIG. 2 It depicts an illustrative diagram illustrating an example of results of detection of persons by sequentially performing photographing by a camera that performs photographing from the diagonal front of a vehicle.

FIG. 3 It depicts an illustrative diagram illustrating an example of results of detection of persons by sequentially performing photographing by a camera that performs photographing from the side of a vehicle.

FIG. 7 It depicts a block diagram illustrating a configuration of an exemplary embodiment for implementing a third invention of the present invention.

DESCRIPTION OF EMBODIMENTS

First Exemplary Embodiment

A first exemplary embodiment of the present invention will be described below with reference to the drawings.

Figure 1:
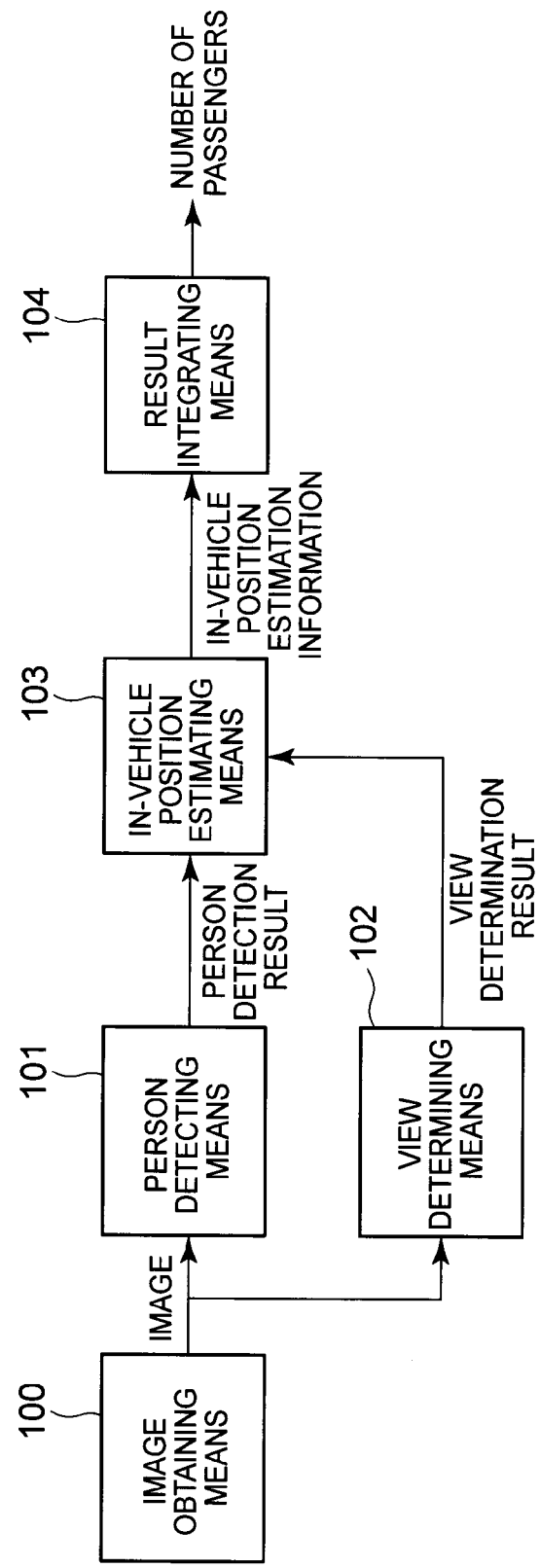
FIG. 1 It depicts a block diagram illustrating a configuration of the best mode for implementing a first invention of the present invention.

FIG. 1 illustrates a configuration of the first exemplary embodiment of a device for measuring the number of passengers of the present invention. The device for measuring the number of passengers of the first exemplary embodiment includes image obtaining means 100, person detecting means 101, view determining means 102, in-vehicle position estimating means 103, and result integrating means 104.

The image obtaining means 100 includes an imaging device such as a camera, and outputs an image obtained by the imaging device.

The person detecting means 101 detects persons in the image output from the image obtaining means 100, and outputs a person detection result.

The view determining means 102 determines the way in which a vehicle is viewed, from the image output from the image obtaining means 100, and outputs a view determination result.

The in-vehicle position estimating means 103 estimates the positions of the persons in the vehicle from the person detection result and the view determination result, and outputs an in-vehicle position estimation result.

The result integrating means 104 integrates in-vehicle position estimation results obtained for a plurality of images, and outputs the number of passengers.

Note that the image obtaining means 100, the person detecting means 101, the view determining means 102, the in-vehicle position estimating means 103, and the result integrating means 104 are implemented by a CPU or the like that performs processes in accordance with software included in the device for measuring the number of passengers.

Next, the operations of the present exemplary embodiment will be described.

First, the image obtaining means 100 obtains an image of the inside of a vehicle photographed from the outside.

At this time, to clearly photograph persons in the vehicle, an infrared illuminator may be used. In this case, the image obtaining means 100 includes an infrared illuminator and projects infrared light into the vehicle using the infrared illuminator. In addition, the image obtaining means 100 can photograph light in the infrared wavelength range. Note that, to reduce the influence of visible light, the image obtaining means 100 may photograph an image using a bandpass filter when obtaining the image such that only the wavelengths in the infrared range are transmitted. Note also that, to suppress reflection on a glass surface, a polarizing filter may be used. By this, using the polarization characteristics of reflected light, the influence exerted on detection by environmental information reflected on the glass surface of the vehicle can be reduced.

The image obtained by the image obtaining means 100 is output to the person detecting means 101 and the view determining means 102. Note that, although in FIG. 1, there is one image obtaining means 100, a plurality of image obtaining means may be provided and used. For example, the vehicle may be photographed from both sides in a driving direction of the vehicle, using two image obtaining means. Then, the following processes may be performed on each of images obtained by the plurality of image obtaining means, and an integration process may be performed finally.

The person detecting means 101 detects persons on board the vehicle from the image.

For example, when, as illustrated in FIG. 2, the faces of persons on board a vehicle are seen at an angle close to the front face, the person detecting means 101 can detect persons using a front-face detector (in FIG. 2, white frames indicate that faces have been detected). Alternatively, when, as illustrated in FIG. 3, the faces of persons on board a vehicle are seen at an angle close to the side, the person detecting means 101 can detect persons using a side-face detector (in FIG. 3, too, white frames indicate that faces have been detected).

These detectors can be structured by learning using a large number of face images photographed from the front and the side. For the detectors, for example, an SVM (Support Vector Machine), LDA (Linear Discriminant Analysis), GLVQ (Generalized Learning Vector Quantization), or a neural network can be used. The positions in the image of the heads of the detected persons are output together with information identifying a frame in which the detection is performed (e.g., frame time information or a frame number), as person detection result information.

The view determining means 102 determines where in the image the vehicle is seen, to determine view from which the vehicle is photographed (from which direction the vehicle is photographed).

Figure 4:
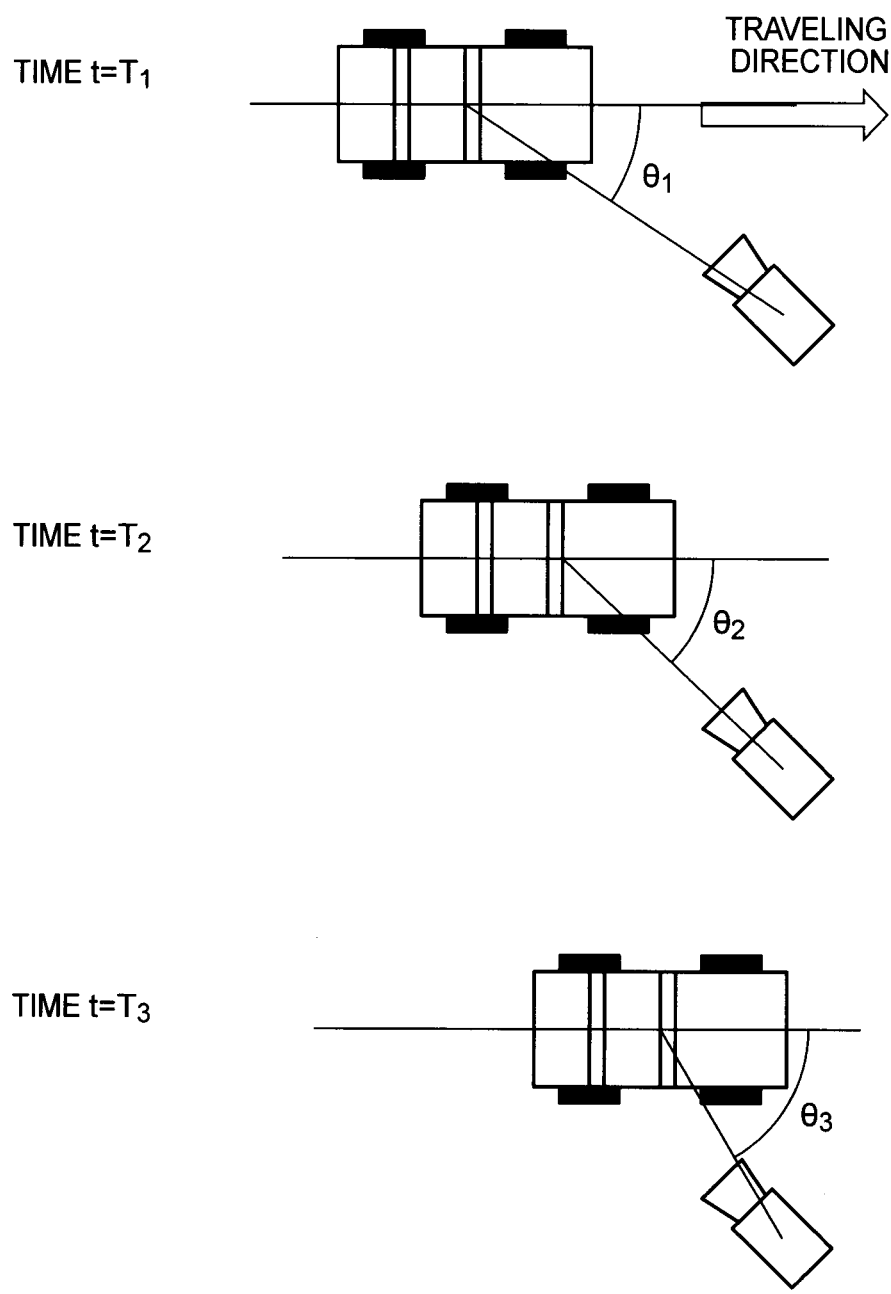
FIG. 4 It depicts an illustrative diagram showing changes over time in the angle between the vehicle and the camera.

When, as illustrated in FIGS. 2 and 3, a running vehicle is photographed using a camera fixed at the side of the road, a relative positional relationship between the camera and the vehicle changes along with the travel of the vehicle, and the position of the vehicle on a screen also changes. Accordingly, as illustrated in FIG. 4, the orientation θ of the vehicle when viewed from the camera also changes, and thus, the way in which the inside of the vehicle is viewed changes. Such a way of viewing is called "view" here. In FIG. 4, θ changes to $\theta_2$, $\theta_2$, and $\theta_3$ along with the travel of the vehicle.

Then, the view determining means 102 determines, from the position of the vehicle in the image, from which view the vehicle is photographed and outputs a view determination result. Here, the view determination result may be an angle made between the vehicle and the camera, or may be information describing the position of the vehicle on the screen, or may be such that an index is assigned to each view and the value of the index is used as a determination result.

For a specific determination of view, for example, the determination can be made by detecting a window pane. Specifically, a region different from a background is extracted from an image and the process of detecting a linear component, such as the Hough transform, is performed on the region to extract a portion corresponding to a window pane, and view is determined from the position of the window pane. Alternatively, using the fact that glass allows light to be transmitted therethrough but the pane portion does not allow light to be transmitted therethrough, the position of a window pane may be detected by a sensor such as a laser. Specifically, view may be determined by detecting the position of a window pane using a sensor which is prepared separately from the camera, and calculating in advance information in which the position is associated with view. Alternatively, using the fact that a vehicle region has the same color, the vehicle region may be extracted from an image and a window pane may be determined. Note that, after a window pane has been able to be detected once, at subsequent times by tracking the window pane between images, the position of the window pane may be determined. In this manner, to which view a current image corresponds can be determined.

The in-vehicle position estimating means 103 estimates, from the person detection result and the view determination result, at which positions in the vehicle the persons are present. Once view has been determined, it can be determined, by geometric constraints, at which positions in the image the persons sitting in seats such as a driver's seat and a passenger seat are viewed. Hence, by comparing the assumed positions with the detected positions, it is determined at which position in the vehicle each of the detected persons is sitting. This determination is made on a frame-by-frame basis and a result of the determination is output as in-vehicle position estimation information.

Figure 5:
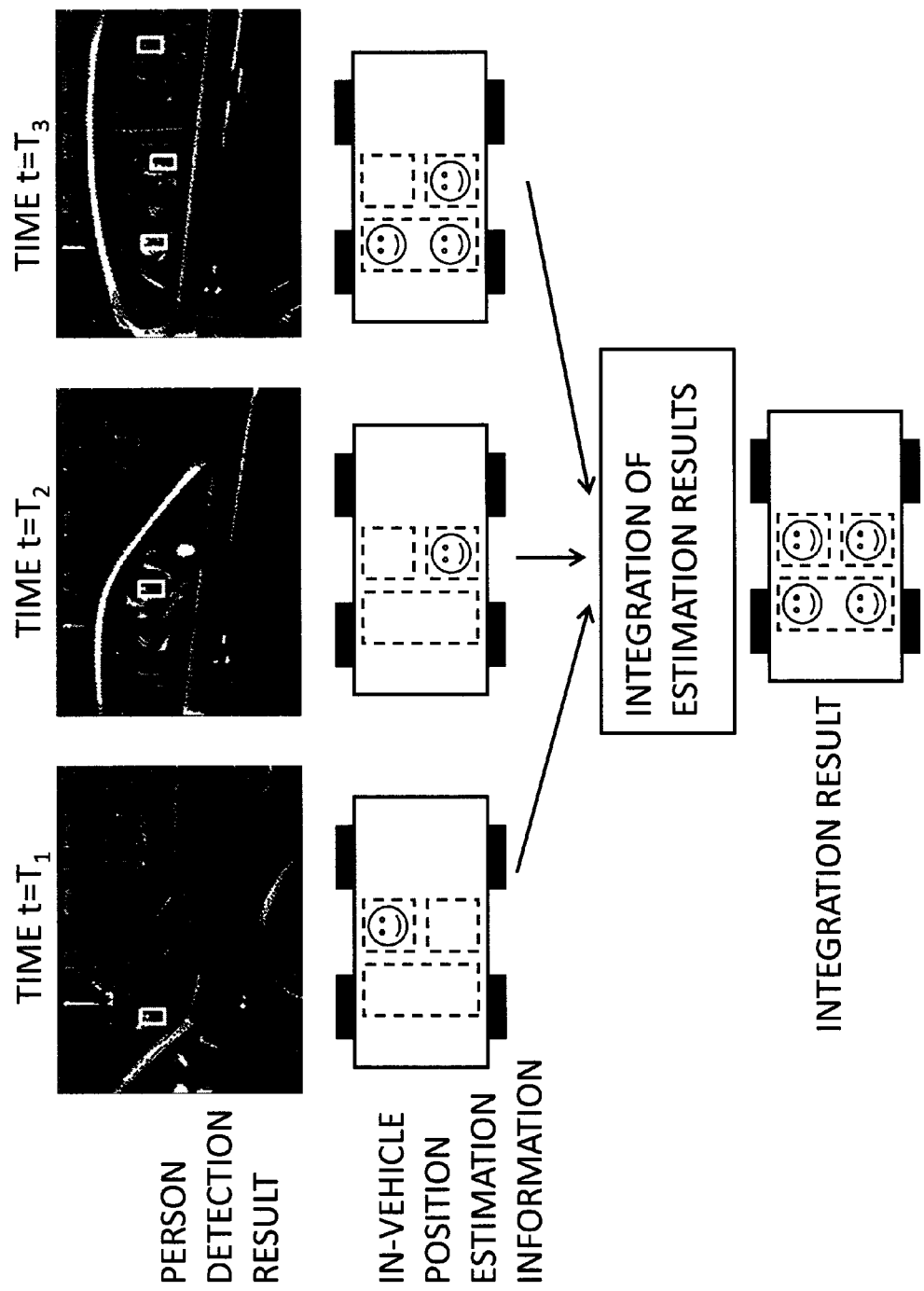
FIG. 5 It depicts an illustrative diagram showing a summary of an integration process.

For example, in an example illustrated in FIG. 5, since, at a time $T_1$, a face is detected at a position corresponding to a passenger seat, it is determined that at this time the person in the passenger seat has been able to be detected. At a subsequent time $T_2$, since a face is detected at a position corresponding to a driver's seat, it is determined that the person in the driver's seat has been detected. Then, at a time $T_3$, since faces are detected at positions corresponding to the driver's seat and the left and right sides of a back seat, it is determined that the persons in the driver's seat and the left and right sides of the back seat have been detected.

In this determination, the determination may be made also taking into account the reliability of detection results. For example, weights may be assigned to determination results, according to the reliability. These pieces of weight information can be used for a determination of the accuracy of a final result after being integrated by the result integrating means 104. In addition, depending on the positional relationship between the camera and the vehicle, the positions at which the faces of persons in the driver's seat and the back seat appear may get close to each other. In this case, a front-back relationship may be determined also taking into account the sizes of the detected faces. In this case, too, instead of limiting to only either one, a detection result may be assigned to both positions, according to the possibility (probability) of being present at each position. In addition, which person in seat being easily detected changes depending on the view. When a person has not been detected at a position where a person is easily detected, a weight may be assigned to the fact that a person is not present at that position, which may be used for subsequent integration.

The result integrating means 104 integrates pieces of information on the estimation of the positions of the persons in the vehicle which are generated on a frame-by-frame basis, to determine how many persons are on board the vehicle. FIG. 5 illustrates an integration state. Here, the above-described results for the time $t=T_1$, $T_2$, and $T_3$ are integrated to determine at which positions the persons are on board the vehicle. Various integration methods are considered, but simply by finding an OR (logical OR) of the estimation results for each view, it can be determined whether persons are present at each seat position in the vehicle. Then, the result integrating means 104 counts the number of the persons determined to be present, and outputs the number of the persons as the number of passengers. If weights according to the reliability have been assigned to each position detection result, they may be added together between frames, and when the resulting value reaches a certain value or more, it may be determined that persons have been detected. At this time, when a weight for not being present has also been determined, the possibility (likelihood) of a person not being present in each seat may be calculated from the weight, and both of the likelihood of a person being present in each seat and the likelihood of a person not being present may be compared with each other to determined whether there is a person.

As such, in the present invention, by integrating partial detection results which are determined in individual images, it is determined whether there are persons in each seat. Thus, persons can be detected more accurately than the case in which the determination is made from only one image.

Second Exemplary Embodiment

A second exemplary embodiment of the present invention will be described below with reference to the drawings.

Figure 6:
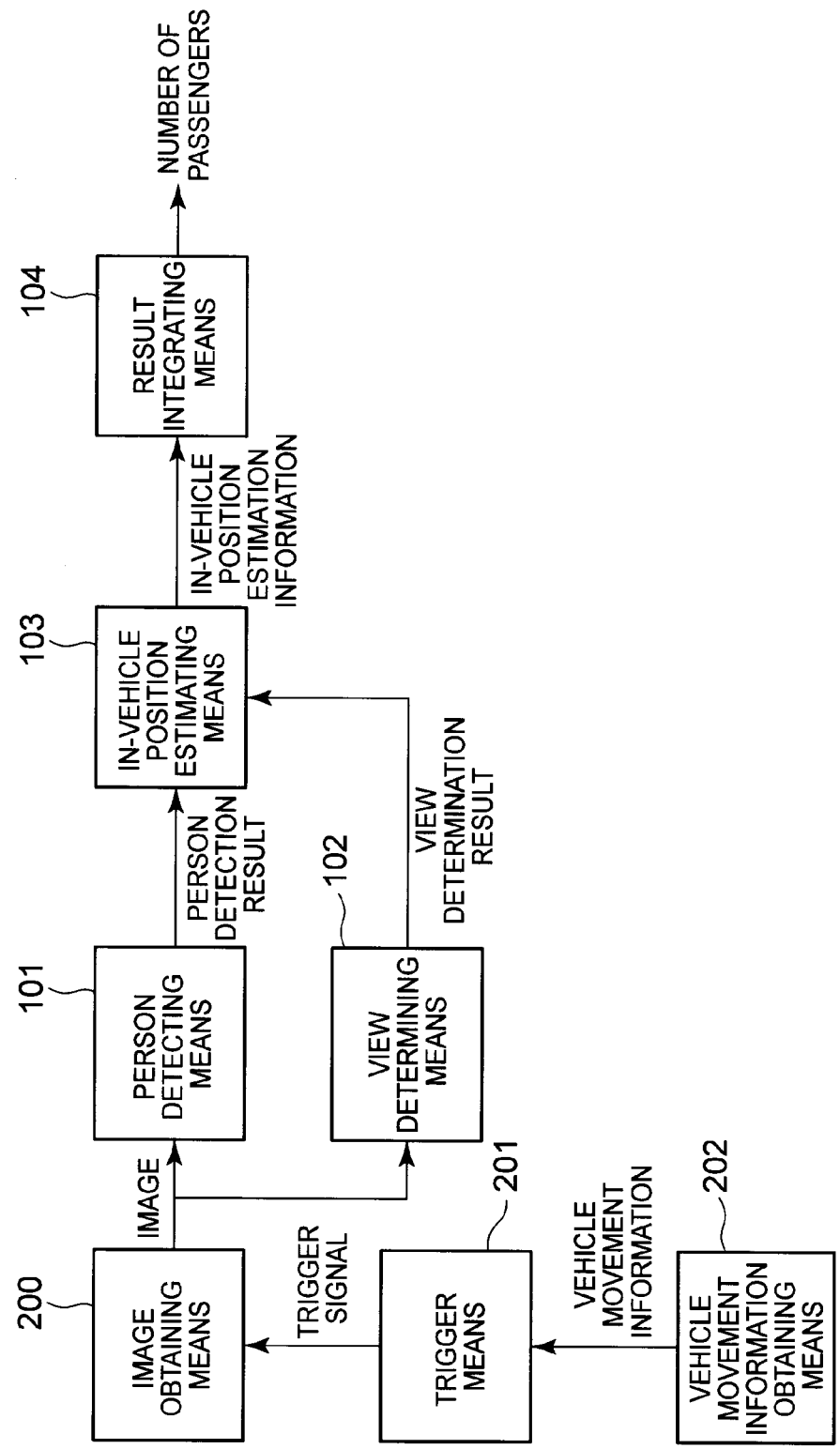
FIG. 6 It depicts a block diagram illustrating a configuration of an exemplary embodiment for implementing a second invention of the present invention.

FIG. 6 illustrates a configuration of the second exemplary embodiment of a device for measuring the number of passengers of the present invention. The device for measuring the number of passengers of the second exemplary embodiment includes image obtaining means 200, person detecting means 101, view determining means 102, in-vehicle position estimating means 103, result integrating means 104, trigger means 201, and vehicle movement information obtaining means 202.

The vehicle movement information obtaining means 202 obtains information about the movement of a vehicle and outputs the information as vehicle movement information to the trigger means 201.

The trigger means 201 generates a trigger signal based on the vehicle movement information and outputs the trigger signal to the image obtaining means 200.

The image obtaining means 200 obtains an image when the trigger signal is input thereto, and outputs the image.

Other means are the same as those of the first exemplary embodiment.

Note that the image obtaining means 200, the trigger means 201, and the vehicle movement information obtaining means 202 are implemented by a CPU or the like that performs processes in accordance with software included in the device for measuring the number of passengers.

Next, the operations of the present exemplary embodiment will be described.

The vehicle movement information obtaining means 202 obtains information about the movement of a vehicle, such as the position or speed of the vehicle, and outputs the information to the trigger means 201.

For example, the vehicle movement information obtaining means 202 detects, using a passage sensor placed at the side of the road, etc., that the vehicle has passed through a specific position, and generates a time at which the passage is detected, as vehicle movement information and outputs the vehicle movement information. If passage sensors are placed at a plurality of positions, information identifying that location is also included in the vehicle movement information.

In addition, when a plurality of passage sensors are used, the vehicle movement information obtaining means 202 obtains times at which the vehicle has passed through each passage sensor, to calculate the time taken to move between the sensors, and divides the time by a distance between the passage sensors, and can thereby calculate the speed of the vehicle. This speed information may also be included in the vehicle movement information. In addition, vehicle speed information may also be obtained using another sensor such as radar.

When the vehicle movement information is input to the trigger means 201 from the vehicle movement information obtaining means 202, the trigger means 201 generates a trigger signal at predetermined timing and outputs the trigger signal.

For example, when the position of the passage sensor or the output timing of vehicle movement information is adjusted such that the timing at which vehicle movement information is input is timing just suitable for photographing persons in the vehicle, the trigger means 201 generates a trigger signal immediately after vehicle movement information is input thereto. Thereafter, timings at which the persons in the vehicle are easily seen are determined in advance according to the movement of the vehicle, and when the timings have come, trigger signals are generated one by one.

Since the timings at which the second and subsequent trigger signals are generated change depending on the speed of the vehicle, when the vehicle movement information includes vehicle speed information, the timings at which trigger signals are generated may be adjusted according to the speed. Specifically, the trigger means 201 compares a vehicle speed which is assumed when trigger signal generation timing is determined in advance, with the actual vehicle speed and adjusts the timings at which trigger signals are generated, according to the ratio between the speeds.

By this, even when the speed varies, the inside of the vehicle can be photographed from desirable positions, improving the accuracy of detection of persons compared to the case of obtaining images at regular intervals.

When the trigger signal is output from the trigger means 201, the image obtaining means 200 performs photographing at that timing. When an illuminator is used, the timing at which the illuminator irradiates with light is also allowed to be synchronized with the shooting timing. Other operations are the same as those of image obtaining means 100 illustrated in FIG. 1, and the image obtaining means 200 outputs an image to the person detecting means 101 and the view determining means 102.

The operations of the person detecting means 101, the view determining means 102, the in-vehicle position estimating means 103, and the result integrating means 104 are the same as those of the first exemplary embodiment.

In the case of the second exemplary embodiment, photographing can be performed at timing at which persons in a vehicle are easily photographed. Thus, the accuracy of detection of persons is increased, and the accuracy of the number of passengers obtained in the end can also be improved.

Third Exemplary Embodiment

A third exemplary embodiment of the present invention will be described below with reference to the drawings.

FIG. 7 illustrates a configuration of the third exemplary embodiment of a device for measuring the number of passengers of the present invention. The device for measuring the number of passengers of the third exemplary embodiment includes image obtaining means 100, person detecting means 301, view determining means 102, in-vehicle position estimating means 103, and result integrating means 104.

The image obtaining means 100 outputs an obtained image to the person detecting means 301 and the view determining means 102.

The view determining means 102 outputs a view determination result to the in-vehicle position estimating means 103 and the person detecting means 301.

The person detecting means 301 detects, based on the view determination result input from the view determining means 102, persons in the image output from the image obtaining means 100, and outputs a person detection result.

A connecting relationship between other means is the same as that of the first exemplary embodiment.

Note that the person detecting means 301 is implemented by a CPU or the like that performs processes in accordance with software included in the device for measuring the number of passengers.

Next, the operations of the present exemplary embodiment will be described.

The person detecting means 301 limits a region in an image where persons are likely to be present, based on a view determination result input from the view determining means 102, and performs detection of persons on the region. A method of detecting persons is the same as that for person detecting means 101 illustrated in FIG. 1, and the person detecting means 301 generates and outputs a person detection result. In addition, the person detecting means 301 may change a detector to be used, according to view information. Since the orientation of a face with respect to the camera changes depending on the view, a face detector may be changed to another in accordance therewith.

The operations of other means illustrated in FIG. 7 are the same as those of the first exemplary embodiment.

In the third exemplary embodiment, since a region where detection of persons is performed can be limited, the time required to detect persons can be reduced. Note that using the person detecting means 301 instead of the person detecting means 101 is also possible likewise in the second exemplary embodiment.

Some or all of the above-described exemplary embodiments can also be described as shown in the following supplementary notes, but are not limited thereto.

(Supplementary note 1) A device for measuring the number of passengers including: image obtaining means for obtaining an image; person detecting means for detecting, from the obtained image, persons on board a vehicle which is a target for measuring the number of persons, and generating a person detection result; view determining means for determining view indicating how the vehicle is viewed in the image, and generating a view determination result; in-vehicle position estimating means for estimating, from the person detection result and the view determination result, at which positions in the vehicle the persons are on board and generating, for each image, an in-vehicle position estimation result; and result integrating means for integrating the plurality of in-vehicle position estimation results obtained for the vehicle and determining the number of passengers from an integration result.

(Supplementary note 2) The device for measuring the number of passengers according to the supplementary note 1, further including: vehicle movement information obtaining means for obtaining information about a movement state of the vehicle and generating the information as vehicle movement information; and trigger means for generating a trigger signal based on the vehicle movement information and according to predetermined timing, wherein the image obtaining means obtains an image in accordance with the trigger signal.

(Supplementary note 3) The device for measuring the number of passengers according to the supplementary note 2, wherein the vehicle movement information obtaining means determines, for each of one or more predetermined points, whether the vehicle has passed through the predetermined point, and generates vehicle movement information based on a result of measurement of a time of the passage, and the predetermined timing is determined based on the time of the passage through the predetermined point included in the vehicle movement information.

(Supplementary note 4) The device for measuring the number of passengers according to the supplementary note 2 or 3, wherein the vehicle movement information obtaining means measures a speed of the vehicle, and the vehicle movement information includes a result of the measurement of the speed of the vehicle, and the predetermined timing is adjusted based on the speed of the vehicle included in the vehicle movement information.

(Supplementary note 5) The device for measuring the number of passengers according to any one of the supplementary notes 1 to 4, wherein the image obtaining means includes an infrared illuminator, and obtains an image by projecting light into the vehicle in accordance with image obtaining timing and photographing light in an infrared wavelength range.

(Supplementary note 6) The device for measuring the number of passengers according to any one of the supplementary notes 1 to 5, wherein the person detection result is generated by performing a process of detecting a face on the obtained image.

(Supplementary note 7) The device for measuring the number of passengers according to any one of the supplementary notes 1 to 6, wherein the view determining means determines view by detecting a window pane of the vehicle from the image obtained by the image obtaining means.

(Supplementary note 8) The device for measuring the number of passengers according to any one of the supplementary notes 1 to 7, wherein the in-vehicle position estimating means compares positions at which the persons sitting at seat positions in the vehicle are seen in the image and which are assumed based on the view determination result, with positions of the persons in the image included in the person detection result, to determine in which seats in the image the detected persons have sat.

(Supplementary note 9) The device for measuring the number of passengers according to any one of the supplementary notes 1 to 8, wherein the result integrating means generates the integration result by finding a logical OR of the obtained plurality of in-vehicle position estimation results.

(Supplementary note 10) The device for measuring the number of passengers according to any one of the supplementary notes 1 to 9, wherein the person detecting means performs detection of persons by limiting a region in the image where persons are likely to be present, using the view determination result.

This application claims priority based on Japanese Patent Application No. 2012-236246 filed Oct. 26, 2012, the entire disclosure of which is incorporated herein by reference.

Although the invention of the present application has been described above with reference to exemplary embodiments, the invention of the present application is not limited to the above-described exemplary embodiments. Various changes understandable by those skilled in the art may be made to the configuration and details of the invention of the present application within the scope of the invention of the present application.

INDUSTRIAL APPLICABILITY

The above-described result of measurement of the number of passengers can be used, for example, for an automatic determination of a vehicle that can travel an HOV (High Occupancy Vehicle) lane, a count of the number of visitors on board a vehicle in a theme park, etc., and automatic detection of a vehicle overloaded with passengers.

REFERENCE SIGNS LIST

100 Image obtaining means
101 Person detecting means
102 View determining means
103 In-vehicle position estimating means
104 Result integrating means
200 Image obtaining means
201 Trigger means
202 Vehicle movement information obtaining means
301 Person detecting means

What is claimed is:

1. A device for measuring a number of passengers, comprising:
   an image obtaining unit, implemented by a processor, for obtaining images;
   a person detecting unit, implemented by the processor, for detecting persons in each of the images and generating positions of detected persons in each of the images, the vehicle being a target for measuring a number of persons;
   a view determining unit, implemented by the processor, for outputting a view determination result for each of the images, the view determination result being information describing the position of the vehicle with respect to a capture position of the respective image;
   a seat position obtaining unit, implemented by the processor, for obtaining seat positions at which the persons may be on board in the vehicle, based on geometric constraints between the seat positions and the view determination result for each of the images;
   an in-vehicle position estimating unit, implemented by the processor, for estimating, for each of the images, from a comparison between the positions of detected persons and the seat positions an in-vehicle position estimation result representing the seat positions at which the detected persons are seated in the vehicle; and
   a result integrating unit, implemented by the processor, for integrating the plurality of in-vehicle position estimation results and determining a number of passengers in the vehicle from the integrated in-vehicle position estimation results.

2. The device for measuring a number of passengers according to claim 1, further comprising:
   a vehicle movement information obtaining unit, implemented by the processor, for obtaining information about a movement state of the vehicle and generating the information as vehicle movement information; and
   a trigger unit, implemented by the processor, for generating a trigger signal based on the vehicle movement information and according to predetermined timing, wherein
   the image obtaining unit obtains an image in accordance with the trigger signal.

3. The device for measuring a number of passengers according to claim 2, wherein
   the vehicle movement information obtaining unit determines, for each of one or more predetermined points, whether the vehicle has passed through the predetermined point, and generates vehicle movement information based on a result of measurement of a time of passage, and the predetermined timing is determined based on the time of the passage through the predetermined point included in the vehicle movement information.

4. The device for measuring a number of passengers according to claim 2, wherein
   the vehicle movement information obtaining unit measures a speed of the vehicle, and the vehicle movement information includes a result of the measurement of the speed of the vehicle, and
   the predetermined timing is adjusted based on the speed of the vehicle included in the vehicle movement information.

5. The device for measuring a number of passengers according to claim 1, wherein the image obtaining unit includes an infrared illuminator, and obtains images by projecting light into the vehicle in accordance with image obtaining timing and photographing light in an infrared wavelength range.

6. The device for measuring a number of passengers according to claim 1, wherein the positions of detected persons are generated by performing a process of detecting a face on each obtained image.

7. The device for measuring a number of passengers according to claim 1, wherein the view determining unit determines view by detecting a window pane of the vehicle from each of the images obtained by the image obtaining unit.

8. The device for measuring a number of passengers according to claim 1, wherein the in-vehicle position estimating unit compares positions at which the persons sitting at seat positions in the vehicle are seen in the image and which are assumed based on the view determination result, with positions of the persons in the image, to determine in which seats in the image the detected persons have sat.

9. A method for measuring a number of passengers, comprising:
   obtaining images;
   detecting persons in each of the images and generating positions of detected persons in each of the images, the vehicle being a target for measuring a number of persons;
   outputting a view determination result for each of the images, the view determination result being information describing the position of the vehicle with respect to a capture position of the respective image;
   obtaining seat positions at which the persons may be on board in the vehicle, based on geometric constraints between the seat positions and the view determination result for each of the images;
   estimating, for each of the images, from a comparison between the positions of detected persons and the seat positions an in-vehicle position estimation result representing the seat positions at which the detected persons are seated in the vehicle; and
   integrating the plurality of in-vehicle position estimation results and determining a number of passengers in the vehicle from the integrated in-vehicle position estimation results.

10. A non-transitory computer-readable recording medium in which a program for measuring a number of passengers is recorded, the program causing a computer to perform:
   a process of obtaining images;
   a process of detecting persons in each of the images and generating positions of detected persons in each of the images, the vehicle being a target for measuring a number of persons;
   a process of outputting a view determination result for each of the images, the view determination result being information describing the position of the vehicle with respect to a capture position of the respective image;
   a process of obtaining seat positions at which the persons may be on board in the vehicle, based on geometric constraints between the seat positions and the view determination result for each of the images; and
   a process of estimating, for each of the images, from a comparison between the positions of detected persons and the seat positions an in-vehicle position estimation result representing the seat positions at which the detected persons are seated in the vehicle; and
   integrating the plurality of in-vehicle position estimation results and determining a number of passengers in the vehicle from the integrated in-vehicle position estimation results.

* * * * *